United States Patent [19]

Suzuki et al.

[11] 3,927,968

[45] Dec. 23, 1975

[54] PROCESS FOR PRODUCING AN ION-EXCHANGEABLE AND SOLVENT-RESISTANT FILAMENTARY STRUCTURE

[75] Inventors: Hideaki Suzuki, Machida; Haruo Togawa, Koganei; Akira Omori, Sagamihara; Naoki Yamamoto, Hino, all of Japan

[73] Assignee: Teijin Limited, Osaka, Japan

[22] Filed: May 8, 1973

[21] Appl. No.: 358,327

[30] Foreign Application Priority Data
May 10, 1972 Japan.................................. 47-45346

[52] U.S. Cl..................................... 8/115.5; 8/120
[51] Int. Cl.²..................................... D06M 11/02
[58] Field of Search....................... 8/115.5, 120

[56] References Cited
UNITED STATES PATENTS
3,310,532  3/1967  Kazama et al................... 8/115.5 X
3,423,161  1/1969  Chen et al........................ 8/115.5 X Primary Examiner—Stephen J. Lechert, Jr.
Attorney, Agent, or Firm—Sherman & Shalloway

[57]  ABSTRACT

A solvent-resistant filamentary structure having superior ion-exchangeability which comprises at least 20 percent by weight of aromatic nuclear structural units derived from an aromatic monovinyl monomer, 2 to 40 out of 100 of such aromatic nuclear structural units being cross-linked by crosslinkages of the formula

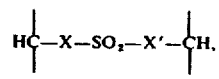

such filamentary structure not containing a crosslinkage expressed by the formula

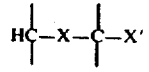

and the remainder of the aromatic nuclear structrual units, either partly or wholly, having incorporated therein an ion-exchangeable group, and a method for producing the same.

5 Claims, No Drawings

PROCESS FOR PRODUCING AN ION-EXCHANGEABLE AND SOLVENT-RESISTANT FILAMENTARY STRUCTURE

This invention relates to an ion-exchangeable and solvent-resistant filamentary structure having superior ion-exchanging ability characterized by excellent ion-exchange velocity and exchange capacity, insolubility in boiling toluene, uniformity of crosslinkages, and good durability under conditions required for regeneration treatment, and to a process for its production within a shortened cross-linking time.

More specifically, the invention relates to a solvent-resistant filamentary structure comprising at least 20 percent by weight of aromatic nuclear structural units derived from an aromatic monovinyl monomer, 2 to 40 out of 100 of such aromatic nuclear structural units being cross-linked by crosslinkages of the following formula (I)

  (I)

wherein X and X' are the same or different and each represent aromatic nuclear structural units derived from an aromatic monovinyl monomer which may have a substituent, such filamentary structure not containing a crosslinkage expressed by the formula

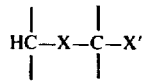

wherein X is the same as defined above and X' is the same as defined above or a hydrogen atom, and the remainder of the aromatic nuclear structural units, either partly or wholly, having incorporated therein an ion-exchangeable group; and to a process for producing the filamentary structure.

Ion-exchange resins in the form of filamentary structure have recently attracted attention because of their superior ion-exchanging velocity and ease of separation from the treating liquid when compared to those in the granular form. Polystyrene cross-linked with divinyl benzene, which is known as a granular ion-exchange resin, is stable under severe chemical conditions employed for the introduction of an ion-exchangeable group, but because it is already in the cross-linked state, it cannot be formed into fibers. On the other hand, the fibers of other polymers, such as polyamides or polyesters, undergo degradation or decomposition under conditions required for introduction of an ion-exchangeable group, for example, chloromethylation or sulfonation, thus making it impossible to provide a feasible ion-exchangeable filamentary structure.

Some attempts have previously been made to provide an ion-exchangeable filamentary structure by utilizing polystyrene not cross-linked with divinyl benzene. For example, U.S. Pat. No. 3,386,797 discloses a method wherein a copolymer of an aromatic monovinyl monomer and butadiene or vinyl chloride is subjected to the action of a Lewis acid or strong acid to alkylate the aromatic ring. Furthermore, U.S. Pat. No. 3,111,361 discloses a method wherein an aromatic monovinyl polymer is treated with a Lewis acid in a complexing solvent for the Lewis acid compound to alkylate the aromatic nucleus of the polymer by the main chain of another polymer. However, when the aromatic ring is alkylated with units of butadiene or vinyl chloride, crosslinking is effected through these units, and therefore, it is difficult to obtain the desired crosslinking density uniformly. Furthermore, these alkylation reactions occur at a very slow rate of reaction, and require several hours to several days until the completion of the reaction. accordingly, these methods are not commercially feasible.

Extensive work of the inventors has led to the discovery of a novel ion-exchangeable and solvent-resistant filamentary structure which has cross-linkages expressed by the formula (I)

  (I)

wherein X, and X' are the same as defined above, and does not contain crosslinkages expressed by the following formula

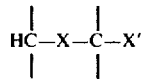

wherein X is the same as defined above with respect to formula (I), and X' is the same as above or a hydrogen atom, which the fibrous structures disclosed in the above cited conventional techniques always possess.

It has also been found that a filamentary structure comprising at least 20 percent by weight of aromatic nuclear structural units derived from an aromatic monovinyl monomer, 2 to 40 out of 100 of such aromatic nuclear structural units having a cross-linked structure expressed by the formula (I) above, such filamentary structure not containing a cross-linked structure expressed by the formula

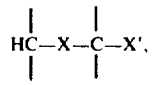, and the remainder of the cross-linked aromatic nuclear structural units, either partly or wholly, having an ion-exchangeable group introduced therein, can achieve the above-mentioned improved properties.

It has also been found that such a filamentary structure can be produced by reacting a filamentary structure comprising at least 20 percent by weight of aromatic nuclear structural units derived from an aromatic monovinyl monomer with chlorosulfonic acid to form a cross-linked filamentary structure in which 2 to 40 out of 100 of the aromatic nuclear structural units are cross-linked by crosslinkages of the formula (I) and which do not contain a cross-linked structure expressed by the formula

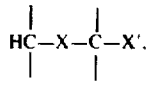, and then introducing an ion-exchangeable functional group thereinto.

Accordingly, an object of this invention is to provide a novel cross-linked ion-exchangeable and solvent-resistant filamentary structure which have various improved properties such as excellent ion exchangeability, resistance to boiling toluene, uniform crosslinking density, and durability under regeneration treatment conditions, and can be produced easily within shortened periods of time.

Another object of this invention is to provide a method for producing such filamentary structure.

Many other objects of this invention along with its advantages will become more apparent from the following description.

Preferred examples of the monovinyl aromatic monomer used to form the filamentary structure comprising at least 20 percent by weight of aromatic nuclear structural units derived from an aromatic monovinyl monomer are styrene, α-methylstyrene, halogenated styrenes, and vinyl naphthalenes. Examples of the preferred polymers or copolymers derived from such monomers are homopolymers of the above monomers, especially styrene, copolymers of at least two of these monomers, and copolymers of at least one of these monomers with monomers copolymerizable therewith, such as ethylene, propylene, acrylonitrile, a methacrylic acid ester or vinyl acetate. There can also be used blends of at least two of these polymers or copolymers, or blends of at least one of these polymers or copolymers with other polymers or copolymers. In any of the above-mentioned cases, the resin for forming the filamentary structure comprises at least 20 percent by weight, preferably at least 40 percent by weight, more preferably at least 65 percent by weight, of aromatic nuclear structural units derived from an aromatic monovinyl monomer. Where the other polymers or copolymers of the blends as described above are easily soluble in an ordinary solvent such as benzene, toluene, methyl ethyl ketone or methylene chloride, it is recommended that the aromatic nuclear structural units derived from an aromatic monovinyl monomer be blended in an amount of at least 40 percent by weight, preferably at least 65 percent by weight, more preferably at least 80 percent by weight. Where polymers or copolymers which are difficultly soluble in the above solvents are used, it is recommended that the aromatic nuclear structural units derived from an aromatic monovinyl monomer be blended in an amount of at least 30 percent by weight, preferably at least 40 percent by weight, more preferably at least 65 percent by weight.

The filamentary structure to be cross-linked in accordance with this invention may be in the form of fibers, filaments, yarns, tows, strands, webs, matts, knitted fabrics, woven fabrics, non-woven fabrics or the like. For example, the filamentary structure may be fibers of optional denier produced by melt-spinning, dry-spinning or wet-spinning the above resins, or composite fibers made from these fibers, fibrous materials obtained by forming the polymers into films and slitting the films by any desired method, or fibrous materials obtained by extruding the above polymers together with a blowing agent through a slit die and drawing the extruded product in one direction. Any other known method for preparing filaments may be employed. The fibrous materials obtained by extruding a polymer containing a foaming agent through a slit die are in the form of non-woven cloth, and the individual constituent fibers are connected in a network structure. Therefore, because of the stretching of the network structure, this material can be maintained at a constant length even against swelling or shrinkage during a chemical treatment.

In accordance with the method of this invention, a filamentary structure comprising at least 20 percent by weight of aromatic nuclear structural units derived from an aromatic monovinyl monomer is reacted with chlorosulfonic acid to form a structure in which 2 to 40, preferably 5 to 15, out of 100 of the aromatic nuclear structural units are cross-linked by crosslinkages of the following formula (I)

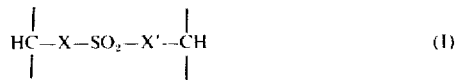

wherein X and X' are the same as defined above, and which does not contain crosslinkages expressed by the formula

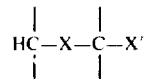

wherein X is the same as defined with respect to formula (I) and X' is the same as X or a hydrogen atom. The filamentary structure of this invention is characterized in that it does not contain the crosslinkages of the formula

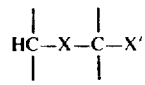

of which the conventional cross-linked filamentary structure is substantially composed.

The crosslinking reaction can be performed by contacting the filamentary structure with chlorosulfonic acid. Chlorosulfonic acid may be used alone or as diluted with a solvent. When the solvent is a good solvent for the aromatic monovinyl polymer, for example, methylene chloride, chloroform, 1,2-dichloroethane or tetrachloroethane, the concentration of chlorosulfonic acid should be at least 85 percent by weight; otherwise the form of the filamentary structure cannot be retained. Where the solvent is a nonsolvent for the aromatic monovinyl polymer, for example, sulfuric acid, the concentration of chlorosulfonic acid should be not less than 30 percent by weight; otherwise, the sulfone crosslinkages are not formed to the desired extent.

Using polystyrene as an example, this cross-linking insolubilizing reaction can be shown schematically as follows:

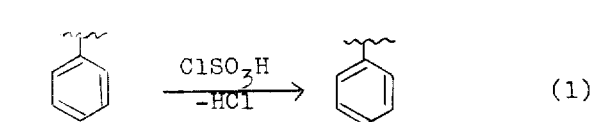

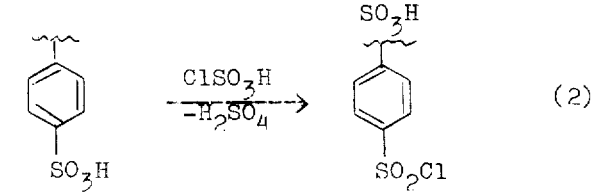

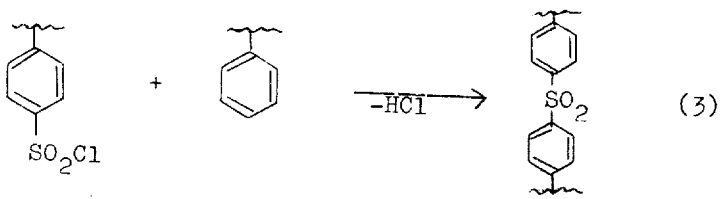

The crosslinking reaction consists of the above three stages. If the concentration of chlorosulfonic acid is low, the aromatic ring is consumed by reaction (1) before reaction (2) having a relatively slow rate of reaction proceeds. Therefore, the ratio of crosslinkages to be brought about by reaction (3) decreases. Furthermore, if the reaction temperature is low, reaction (3) proceeds to a greater extent since reaction (1) is more temperature dependent than reaction (3). This may result in excessive crosslinking.

The conditions for the reaction with chlorosulfonic acid may be selected from those which result mainly in the formation of sulfone crosslinkages according to the type of the desired functional group to be introduced after the crosslinking reaction. It is also possible to choose such conditions as will induce sulfone crosslinking and the introduction of a chlorosulfone group at the same time, and then to convert the chlorosulfone group to a functional group having ion exchangeability.

The crosslinking reaction conditions can be selected in consideration of the above-mentioned factors.

For example, where it is desired to limit the number of the crosslinkages of formula (I) to not more than 10 per 100 of the aromatic nuclear structural units and to introduce about 1 to 30 chlorosulfone groups per 100 of the aromatic nuclear structural units, the reaction is preferably carried out at about 25°C. for 1 to 30 seconds. When it is desired to provide about 30 crosslinkages of formula (I) per 100 of the aromatic nuclear structural units and to introduce about 50 to 70 chlorosulfone groups, the reaction is preferably carried out at about 25°C. for 3 to 20 minutes. Usually, the reaction temperature is selected within the range of −20° to +80°C., and the reaction time, within the range of 1 second to 30 minutes.

The actual operation of the crosslinking reaction is not particularly restricted, and any desired means can be employed which will ensure the uniform contacting between the filamentary structure and chlorosulfonic acid. For example, there can be used a means of dipping the filamentary structure in chlorosulfonic acid, a means of passing the filamentary structure through a chlorosulfonic acid bath, and a means of spraying chlorosulfonic acid onto the filamentary structure.

This contacting with chlorosulfonic acid imparts a high level of solvent-resistance to the filamentary structure of the aromatic monovinyl polymer without impairing its original shape and properties. Since the filamentary structure has a very large surface area as compared with a granular material, the crosslinkages can be formed almost uniformly within the polymer, and only the sulfone group crosslinkage can impart feasible solvent resistance to the filamentary structure.

When granular polystyrene is immersed in 100 percent chlorosulfonic acid, the resin is partially carbonized and colored. In contrast, a fibrous material of polystyrene can be treated uniformly without carbonization even when immersed in 100 percent chlorosulfonic acid. This is because the surface area is larger and a local heat generation by the reaction is reduced.

The insolubilizing treatment of the fibrous material of an aromatic monovinyl polymer in this invention can be performed efficiently within very short periods of time. The resulting insolubilized fibrous material has superior solvent resistance, thermal resistance and chemical resistance. This fact demonstrates that the process of this invention is far superior to the conventional techniques.

Conventional techniques for insolubilizing a fibrous material of an aromatic monovinyl polymer include a method wherein a copolymer of an aromatic monovinyl compound and polyene or an alkenyl halide is treated with a Lewis acid or strong acid to alkylate the aromatic nucleus with the main chain of the polymer, and a method wherein an aromatic monovinyl polymer is treated with a Lewis acid in a solvent capable of forming a complex with the Lewis acid thereby to cross-link the polymer. However, these crosslinking methods require a long treatment time up to several days. For example, according to the latter method, in order to obtain insolubilized fibers of polystyrene having about 93 percent insolubility in toluene, an equilibrium swelling ratio of not more than 2.6 on a weight basis, and a resistance to shrinkage at a temperature up to 200°C., it is necessary to employ a commercially infeasible process which involves immersing the fibers in a nitromethane solution of aluminum chloride at 30°C. for 24 hours. In the former method, fibers prepared from a blend of 85 parts of polystyrene and 15 parts of polybutadiene are immersed in 95 percent sulfuric acid at 25°C. for 1 day in order to cross-link them to such an extent that the fibers are endurable to dry cleaning and have resistance to shrinkage at a temperature up to 200°C.

In contrast, according to the present invention, when a fibrous structure of polystyrene is immersed in chlorosulfonic acid at room temperature for only 20 seconds, the fibrous structure becomes solvent resistant. Thus, even if the fibrous material is heated under reflux in a solvent such as methylene chloride, trichloroethylene, benzene, toluene, tetrahydrofuran or N,N-dimethyl formamide, no decrease in weight is observed. The cross-linked fibrous material has an equilibrium swelling ratio in toluene of not more than 1.6, and a shrinkage of not more than 1.5 percent after standing in air at 200°C. for 1 hour and not more than 3 percent after standing in air at 250°C. for 1 hour. Thus, there can be obtained an insoluble infusible fibrous material having high levels of solvent resistance and thermal resistance. Furthermore, the introduction of an ion exchangeable group such as a sulfonic acid group or amino group can be performed generally within 30 minutes to 5 hours. The process of this invention thus exhibits great commercial advantages.

The cross-linked filamentary structure is reacted in accordance with this invention with a reagent for introducing a group having ion-exchangability, thereby to introduce the ion-exchangeable group into a part or whole of the remainder of the aromatic nuclear structural units.

Examples of the ion-exchangeable group are a sulfonic acid group, —COR.COOH wherein R is an alkylene group containing 1 to 4 carbon atoms, or a phenylene group, a carboxyl group, an alkali metal salt of any of the above-cited groups,

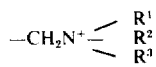

wherein $R^1$, $R^2$ and $R^3$ are the same or different and each represent an alkyl group having 1 to 4 carbon atoms, a phenyl group or a β-hydroxyethyl group,

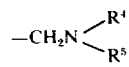

wherein $R^4$ and $R^5$ are the same or different, and each represent a hydrogen atom, an alkyl group containing 1 to 4 carbon atoms, a phenyl group or a β-hydroxyethyl group,

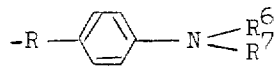

wherein $R^6$ and $R^7$ are the same or different and each represent a hydrogen atom or a methyl group, —CH$_2$—(NHCH$_2$CH$_2$)$_n$ NH$_2$ wherein $n$ is an integer of 1 to 5, and —(CH$_2$NH—CH$_2$)$_m$ NH$_2$ wherein $m$ is 1 or an integer of 3 to 6.

The means for introducing these cation exchangeable and anion exchangeable groups into the remainder of the aromatic nuclear structural units may be any desired known means. Some embodiments will be described below.

Introduction of Cation Exchange Group

1. In order to introduce a strongly acidic cationic exchange group, the above-mentioned cross-linked filamentary structure is treated with a sulfonating agent such as chlorosulfonic acid, conc. sulfuric acid, sulfuric anhydride or fuming sulfuric acid, and if desired, hydrolyzed.

It is possible for instance to perform the cross-linking reaction with chlorosulfonic acid for a time longer than that required for the desired cross-linking, thereby to induce both the crosslinking and chlorosulfonation at the same time, and then hydrolyzing the product to convert the chlorosulfone group to a sulfonic acid group. Alternatively, the filamentary structure may first be cross-linked, and then sulfonated with conc. sulfuric acid, sulfuric anhydride, or fuming sulfuric acid. More specifically, the following procedures are possible.

a. The cross-linking reaction is performed with chlorosulfonic acid having a concentration of more than 85 percent by weight, preferably more than 95 percent by weight, at −10° to 35°C., preferably at 0° to 30°C. for a period of 30 seconds to 60 minutes, preferably 60 seconds to 30 minutes, and then hydrolyzed.

b. The cross-linked filamentary structure is chlorosulfonated and/or sulfonated with chlorosulfonic acid having a concentration of not more than 70 percent by weight, preferably 15 to 50 percent by weight and/or another sulfonating agent such as conc. sulfuric acid, sulfuric anhydride or fuming sulfuric acid, and if desired, the chlorosulfone group is hydrolyzed. Usually, the reaction temperature is within the range of 0° to 150°C., and the reaction time is within the range of 5 minutes to 2 hours in order to introduce the desired quantity of a sulfonic acid group and/or an alkali metal salt thereof. The above-mentioned hydrolysis reaction can for example be carried out by heating the filamentary structure at 50°–100°C. for 20 to 60 minutes in an about 5 percent solution of a hydroxide or carbonate of an alkali metal in water, methanol, ethanol or the like.

2. In order to introduce a weakly acidic cationic exchange group, the cross-linked filamentary structure is subjected to a Friedel-Crafts reaction in the presence of an acid catalyst and at least one acylating agent selected from the group consisting of polybasic carboxylic anhydrides, polybasic carboxylic acid halides and carbonic acid halides.

Examples of the polybasic carboxylic anhydrides are anhydrides of succinic acid, itaconic acid, maleic acid, phthalic acid, trimellitic acid and pyromellitic acid. Examples of the polybasic carboxylic acid halides are dihalides of oxalic acid, malonic acid, succinic acid, adipic acid, sebacic acid, fumaric acid, itaconic acid, phthalic acid, isophthalic acid, and terephthalic acid, or ester halides of these acids. The carbonic acid halides may, for example, be phosgene and halocarbonic acid esters. Examples of the acid catalyst that can be used include Lewis acids such as aluminum chloride, zinc chloride or stannic chloride, or Bronsted acids such as sulfuric acid, hydrochloric acid, phosphoric acid or glacial acetic acid.

The amount of the acylating agent such as the acid anhydride or acid halide is, for example, 0.1 to 100 moles, preferably 1.0 to 10 mols, per mole of the units derived from an aromatic vinyl compound which are contained in the molecule of the fibrous material of the aromatic monovinyl polymer. The amount of the acid catalyst used is, for example, 0.1 to 20 molar times, preferably 0.5 to 5 molar times, the amount of the acylating agent.

It is preferred that this Friedel-Crafts reaction be carried out by dissolving the acylating agent and the acid catalyst in a suitable solvent such as methylene chloride, 1,2-dichloroethane, petroleum ether, heptane, hexane or octane, and dipping the above-mentioned fibrous material in the resulting solution. The reaction conditions to be employed in this reaction should preferably be mild in general. For example, the reaction temperature is 0° to 100°C., preferably 10° to 50°C., and the reaction time is 1 to 120 minutes, preferably 10 to 60 minutes. Where an acid halide or acid ester halide is used as the acylating agent in the above reaction, a part or whole of the acid halide group or acid ester group introduced into the fibrous material may, if desired, be hydrolyzed after the completion of the above reaction to convert it to a carboxyl group. Thus, preferably, it is possible to introduce into the fibrous material —COR.COOH, wherein R is a group selected from the group consisting of alkylene groups having 1 to 4 carbon atoms and a phenylene group, and/or —COOH and/or alkali metal salts of these groups. The above-mentioned hydrolysis reaction can, for example, be performed by heating the filamentary structure at 50° to 100°C. for 20 minutes to 2 hours in an about 5 percent solution of a hydroxide or carbonate of an alkali metal in water, methanol, ethanol or the like.

Introduction of Anion Exchange Group

1. In order to introduce a strongly basic and/or weakly basic anion exchange group, the cross-linked filamentary structure is chloromethylated with a chloromethylating agent, and then the chloromethylated product is reacted with ammonia and/or an amine. Examples of the chloromethylating agent are chloroalkyl ethers such as chloromethyl methyl ether, chloromethylethyl ether or dichlorodimethyl ether; compounds capable of generating formaldehyde such as formaldehyde, para-aldehyde or trioxane; and dialkyl formals such as dimethyl formal or diethyl formal. These compounds may be used alone or in admixture of two or more. The chloromethylation using such a chloromethylating agent does not particularly require a catalyst, but usually, it is preferred to carry it out in the presence of an acid catalyst. Examples of such a catalyst are Lewis acids such as aluminum chloride, zinc chloride, stannic chloride or boron trifluoride/ether complex, or Bronsted acids such as sulfuric acid, hydrochloric acid, phosphoric acid or glacial acetic acid. The amount of the acid catalyst is for example 0.1 to 20 moles, preferably about 0.5 to 5 moles per mole of the chloromethylating agent. Examples of the amine include polyvalent amines such as ethylene diamine, hexamethylene diamine, diethylene triamine, polyethylene imine or piperazine; tertiary amines such as trimethyl amine, triethyl amine, dimethyl hydroxy ethyl amine, N,N-dimethyl aniline or pyridine; primary amines such as methyl amine, ethyl amine, propyl amine, butyl amine, aniline, or ethanolamine; and secondary amine such as dimethyl amine, diethyl amine, N-methylaniline, or diethanol amine. Where a tertiary amine is used as the amine, there is obtained a strongly basic anion exchange fibrous structure containing an ammonium salt. Where a primary, secondary or polyvalent amine is used, there is obtained a weakly basic anion exchange fibrous structure. The amines may be used in admixture. It is possible to react the weakly basic anion exchange fibrous structure with methyl chloride, methyl bromide or methyl iodide to convert the amino group contained in the molecule to a quaternary ammonium salt, and thereby to convert it to a strongly basic anion exchange fibrous structure. The chloromethylating reaction can be performed, for example, at a temperature of 10° to 100°C. for a period of about 10 minutes to 2 hours. The reaction with the amine and/or ammonia can be effected at a temperature of 0° to 100°C. for a period of about 1 minute to 1 hour.

Thus, this procedure makes it possible to introduce an anion exchange group such as

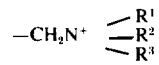

wherein $R^1$, $R^2$ and $R^3$ may be the same or different and are selected from the group consisting of alkyl groups, a phenyl group and a β-hydroxyethyl group,

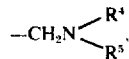

wherein $R^4$ and $R^5$ may be the same or different and are selected from the group consisting of a hydrogen atom, alkyl groups having 1 to 4 carbon atoms, a phenyl group and a β-hydroxyethyl group, —CH$_2$—(NHCH$_2$CH$_2$)$_m$NH$_2$, wherein $n$ is an integer of 1 to 5, and —CH$_2$NH—(CH$_2$)$_m$—NH$_2$, wherein $m$ is 1 or an integer of 3 to 6.

2. The weakly basic anion exchange group can also be obtained by first chloromethylating or chlorosulfonating the cross-linked filamentary structure, and then subjecting the product to a Friedel-Crafts reaction with an aromatic amine compound in the presence of an acid catalyst. Examples of the aromatic amine compound to be reacted with the chloromethyl group are aniline, N-methylaniline, N,N-dimethylaniline, toluidines, anisidines, aminophenols, or phenylene diamines. The aromatic amine that is used for the reaction with the chloro-sulfone group may be aniline or N-methyl aniline, for examples.

Alternatively, part of the chlorosulfone group of the chlorosulfonated filamentary structure is reacted with the aromatic amine compound in the same way as mentioned above to introduce an amino group, and the remaining chlorosulfone group is hydrolyzed to convert it to a sulfonic acid group. This can lead to the formation of a filamentary structure having both the amino group and the sulfonic acid group and having amphoteric ion exchangeability.

Thus, it is possible to introduce an anion exchange group such as

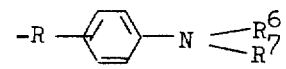

wherein R is —CH$_2$— or —SO$_2$—, and $R^6$ and $R^7$ are the same or different and represent a hydrogen atom or a methyl group, or both this anion exchange group and a sulfonic acid group.

When chloromethylation is performed in order to introduce an ion exchange group, a crosslinkage expressed by the following formula (II) is formed as a result of a side reaction.

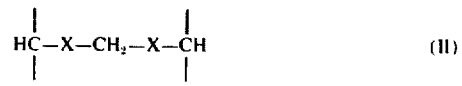

Accordingly, the ion-exchangeability and solvent-resistant filamentary structure obtained in accordance with this invention contains crosslinkages of formula (I) or formulae (I) and (II), and is free from the crosslinkage of the formula

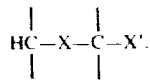

The insoluble fibrous material in accordance with this invention is difficultly soluble in a solvent for polystyrene, and hardly undergoes any chemical change such as hydrolysis even under chemically severe conditions. Furthermore, it is hardly deteriorated by an ion-exchange treatment or regeneration treatment. Accordingly, the insoluble fibrous material in accordance with this invention proves useful not only in fields where ordinary fibrous ion exchangers are used, but also for removing ions from aqueous solutions or removing acidic compounds such as hydrogen sulfide, hydrogen halides, or sulfurous acid gas or a basic compound such as ammonia or an amine from gases.

The invention will be illustrated more specifically by the following Examples in which all parts and percentages are by weight. The "cation exchange capacity" was measured by acid treating 0.5 g of the fibrous material, dipping it for 1 hour in 30 ml. of a 0.1N aqueous solution of sodium hydroxide, and then titrating the concentration of the remaining sodium hydroxide with 0.1N hydrochloric acid. The "anion exchange capacity" was measured by alkali treating 0.5 g of the fibrous material, drying it, and dipping it for 1 hour in 50 ml. of 0.1N hydrochloric acid, and titrating the concentration of the remaining hydrochloric acid with a 0.1N aqueous solution of sodium hydroxide.

The rate (percent) of crosslinking with chlorosulfonic acid was calculated on the basis of the following equation, assuming that the increase in weight owing to the crosslinked sulfone group is obtained by subtracting Y, which is the weight increase owing to the chlorosulfone group as measured from the chlorine analysis value, from X which is the total weight increase owing to the treatment with chlorosulfonic acid.

$$\text{Rate of crosslinking } (\%) = \frac{2 \times \left(\frac{X-Y}{62}\right) \times 100}{\text{Moles of the aromatic monovinyl compound in the fibrous structure}}$$

The rate of crosslinking as obtained by this equation is defined as corresponding to the number of crosslinkings shown in the Examples. For example, the rate of crosslinking of 10 percent means that 10 sulfone groups are cross-linked per 100 of the aromatic ring structural units.

EXAMPLE 1

Nitrogen gas was introduced under a pressure of 15 kg/cm² into a molten mixture of 80 parts of polystyrene and 20 parts of polyethylene at a temperature of about 250°C. in an extruder, and they were thoroughly kneaded. The mixture was extruded from a die through a slit with a clearance of 0.225 mm and a width of 150 mm, and at the die exit, cooling air of about 20°C. was blown against the extruded, molten polymer mixture. Thus the extrudate was quenched to 55°C. and then withdrawn at a draft ratio of 150 and wound up. Then, 40 such wound-up sheets were laminated, opened in the transverse direction at an opening ratio of 10 times, and integrated by passing through a roller press with a pressure of 40 kg/cm². Thus a sheet-like fibrous material having a reticulate fibrous structure was obtained.

The resulting fibrous material was dipped in chlorosulfonic acid at 25°C. for 25 seconds, and squeezed well. It was then immersed in glacial acetic acid to decompose the unreacted chlorosulfonic acid, and then washed well in methanol, followed by drying, thereby to form a crosslinkage in 16.2 percent of the aromatic ring contained in the polymer molecule, and the fibrous material became insoluble in solvent. When the fibrous material so treated with chlorosulfonic acid and subsequently dipped in aqueous ammonia is heated under reflux in a solvent such as methylene chloride, trichloroethylene, benzene, toluene, tetrahydrofuran, or N,N-dimethyl formamide, no weight decrease owing to dissolution was observed. The equilibrium swelling ratio in toluene was less than 1.5, and its shrinkage after standing for 1 hour at 200°C. in air was 1.4 percent. After standing in air at 250°C. for 1 hour, the shrinkage was 2.8 percent.

The resulting insolubilized fibrous material was dipped in a 20 percent methylene chloride solution of chlorosulfonic acid, and reacted for 15 minutes at room temperature. The product was well washed in methylene chloride, and then dipped in methanol to decompose and remove chlorosulfonic acid that remained in a tiny amount therein. Furthermore, the fibrous material was boiled for about 30 minutes in a 5 percent aqueous solution of sodium hydroxide to hydrolyze it, and then washed with water and methanol in this order. There was observed a weight increase of about 80 percent. There was obtained a strongly acidic cation exchanged fibrous material having an ion exchange capacity of 4.1 milliequivalents/g. This fibrous material completely retained the shape of the original fibrous material before the above chemical treatment.

EXAMPLE 2

A non-woven fabric having a sheet-like reticulate fibrous structure of polystyrene which was produced by the same method as set forth in Example 1 was dipped in chlorosulfonic acid at 20°C. for 5 seconds, and then transferred into petroleum ether at 20°C. where it was allowed to stand for 10 minutes. A crosslinkage was generated in about 30 percent of the aromatic ring contained in the polymer molecule, and the fibrous material became insoluble in solvent. The insolubilized non-woven fabric was squeezed well to remove the unreacted chlorosulfonic acid. The remaining chlorosulfonic acid in a tiny amount was decomposed in methanol to remove it completely. The fabric was then boiled for about 30 minutes in a saturated solution of sodium hydroxide in ethanol, then washed with methanol, and dried. There was observed a weight increase of about 50 percent, and there was obtained a cation exchanged fibrous material having an ion exchange capacity of 3.5 milliequivalents/g.

EXAMPLE 3

A sheet-like reticulate fibrous structure composed of 80 parts of polystyrene and 20 parts of polyethylene prepared in the same way as in Example 1 was dipped for 5 seconds in chlorosulfonic acid at 0° to 5°C., and then allowed to stand for 2 minutes in petroleum ether at 0° to 5°C. to form a crosslinkage in 18.3 percent of the aromatic ring contained in the polymer molecule, whereupon the fibrous material was insolubilized. The cross-linked non-woven cloth was reacted in concentrated sulfuric acid containing 0.1 percent of silver sulfate at 90°C. for 30 minutes. After the end of the reaction, the product was washed with water and then with methanol, and dried. A weight increase of about 80 percent was observed, and there was obtained a cation exchanged fibrous material having an ion exchange capacity of 3.8 milliequivalents/g.

EXAMPLE 4

A sheet-like reticulate fibrous material of polystyrene produced in the same way as in Example 1 was dipped for 5 seconds in chlorosulfonic acid at 20°C., squeezed well, and treated with methanol to decompose and remove the remaining chlorosulfonic acid completely. It was then washed with methanol, and dried to form a crosslinkage in 9.8 percent of the aromatic ring present in the polymer molecule. The fibrous material was thus insolubilized. The insolubilized fibrous material was dipped for 30 minutes at 20°C. in a solution consisting of 30 parts of chloromethyl methyl ether, 40 parts of petroleum ether and 30 parts of stannic chloride. The chloromethylated materail was washed with petroleum ether, and then dipped in methanol to decompose and remove the remaining catalyst completely, followed by drying. There was obtained a chloromethylated polystyrene fibrous material having a chlorine content of 20.8 percent.

The chloromethylated polystyrene fibrous material was aminated by immersing in a 40 percent aqueous solution of trimethylamine at 40°C. for 15 minutes, washed with water, and then dried to give a slightly yellowish fibrous material having a strongly basic anion exchanging ability and an anion exchange capacity of 3.6 milliequivalents/g. The resulting fibrous material completely retained the shape of the original fibrous material before the above chemical treatment. Furthermore, anion adsorption by hydrochloric acid and desorption by an aqueous solution of sodium hydroxide were repeated 10 times respectively. There was not change in strength and ion exchange capacity.

EXAMPLE 5

A chloromethylated polystyrene fibrous material prepared in the same way as in Example 4 was reacted in a 50 percent aqueous solution of dimethyl hydroxyethyl amine at 50°C. for 30 minutes, washed with water, and dried to form a fibrous material having a strongly basic anion exchange ability and an ion exchange capacity of 2.9 milliequivalents/g. This material completely retained the flexibility of the original fibrous material.

EXAMPLE 6

A fibrous material having a reticulate fibrous structure and composed of 80 parts of polystyrene and 20 parts of polypropylene which was prepared in the same way as in Example 1 was cross-linked and chloromethylated in the same way as in Example 4 to form a chloromethylated fibrous material having a chlorine content of 16.2 percent. The chloromethylated fibrous material was reacted in a 40 percent aqueous solution of dimethyl amine at 40°C. for 15 minutes, washed with water, and dried to form a fibrous material having a weakly basic anion exchangeability and an anion exchange capacity of 3.8 milliequivalents/g. The resulting fibrous material completely retained the flexibility of the original fibrous material before the above chemical treatment. It could withstand repeated use, and even after regeneration, no change was observed in strength and ion-exchange capacity.

EXAMPLE 7

A fibrous material of polystyrene produced in the same way as in Example 1 was immersed in chlorosulfonic acid at 20°C. for 10 seconds, and then transfered into a 30 percent methylene chloride solution of chlorosulfonic acid where it was reacted at 20°C. for 15 minutes. After the completion of the reaction, the product was well washed in methylene chloride, and then treated in methanol to decompose and remove the chlorosulfonic acid remaining in a tiny amount completely. The chlorosulfonated polystyrene fibrous material was immersed in a 20 percent acetic acid solution of aniline, and reacted for 30 minutes at 90°C. It was then treated with alkali, washed with water, and dried to form a weakly basic anion exchanged fibrous material having a 4-aminophenyl sulfone group. This fibrous material had an ion exchange capacity of 3.2 milliequivalent/g, and fully retained the flexibility of the original fibrous material before the above chemical treatment. When the fibrous material was subjected to anion exchange with hydrochloric acid and regeneration with an aqueous solution of sodium hydroxide each step repeated 10 times respectively, no change was observed in strength and exchange capacity.

EXAMPLE 8

A cross-linked polystyrene fibrous material produced in the same way as in Example 1 was immersed in a solution composed of 30 parts of ethyl chlorocarbonate, 30 parts of aluminum chloride and 40 parts of heptane for 40 minutes at 90°C. to perform the Friedel-Crafts reaction. After completion of the reaction, the fibrous material was washed with heptane, and then the remaining catalyst was completely decomposed and removed in methanol. When it was hydrolyzed by boiling in a 5 percent aqueous solution of sodium hydroxide for 30 minutes, there was obtained a fibrous material having a cation exchange capacity of 4.0 milliequivalents/g and a weakly acidic cation exchanging ability. This fibrous material fully retained the flexibility of the original fibrous material before the above chemical treatment. When cation exchange with a 1N aqeous solution of sodium hydroxide and regeneration with 1N hydrochloric acid were performed 10 times repeatedly, no change was observed in strength and ion exchange capacity. Furthermore, this fibrous material had ion exchangeability in a glycerine solution containihg 0.5 percent of sodium hydroxide at a temperature of 150°C.

EXAMPLE 9

The polystyrene fibrous material having a sheet-like reticulate structure was treated in the same way as in Example 4 except that the amination reaction was performed by immersing the fibrous material in a 50 percent aqueous solution of hexamethylene diamine at 50°C. for 30 minutes.

EXAMPLE 10

The polystyrene fibrous material having a sheet-like reticulate structure was treated in the same way as in Example 4 except that the amination reaction was performed by immersing the fibrous material in a 50 percent aqueous solution of diethylene triamine for 30 minutes.

EXAMPLE 11

The procedure of Example 7 was repeated except that the blended resin was prepared from 80 parts of polystyrene and 20 parts of polypropylene, and the amination reaction of the fibrous material was performed by immersing it in a 20 percent acetic acid solution of N,N-dimethylaniline at 100°C. for 30 minutes.

EXAMPLE 12

The cross-linked polystyrene fibrous material prepared in Example 1 was immersed in a solution consisting of 30 parts of succinic anhydride, 30 parts of stannic chloride, and 40 parts of chloroform at 60°C. for 1 hour to acylate the fibrous material. After completion of the reaction, the fibrous material was washed with chloroform and immersed in methanol to decompose and remove the remaining catalyst completely, followed by drying.

The various results obtained in the above Examples are tabulated below for easy reference.

aromatic monovinyl monomer with chlorosulfonic acid to form a cross-linked structure in which 2 to 40 out of 100 of the aromatic nuclear structural units are cross-linked by crosslinkages of the formula (I)

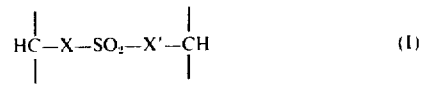

wherein X and X' are the same or different and each represent aromatic nuclear structural units derived from an aromatic monovinyl monomer and which does not contain crosslinkages expressed by the following formula

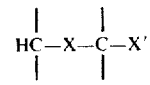

wherein X is the same as defined with respect to (I) and X' is the same as defined above or a hydrogen atom, reacting the cross-linked filamentary structure with a reagent capable of introducing an ion-exchangeable group selected from the group consisting of a sulfonic acid group, —COR.COOH wherein R is an alkylene group containing 1 to 4 carbon atoms or a phenylene group, a carboxyl group, an alkali metal salt of any of the above-cited groups,

| | Cross-linked structure | | | | Properties | | | | |
|---|---|---|---|---|---|---|---|---|---|
| Examples Nos. | Number of cross-linkages of formula(I) 1) | Number of cross-linkages of formula(II) 2) | HC—X—C—X' | Ion-exchangeable groups | Ion-exchange capacity (meq./g) | Boiling toluene insoluble content (%) 3) | Equilibrium swelling ratio in toluene 4) | Shrinkage (%) after heating in air at 200°C for 1 hr 5) | Time required for the reaction (min.) 6) |
| 1 | 16.2 | 0 | 0 | —SO₃H | 4.1 | 100 | 1.3 | 0.6 | 45 |
| 2 | 30.0 | 0 | 0 | —SO₃H | 3.5 | 100 | 1.1 | 0.2 | 40 |
| 3 | 18.5 | 0 | 0 | —SO₃H | 3.8 | 100 | 1.1 | 0.5 | 35 |
| 4 | 9.8 | * | 0 | —CH₂N⁺(CH₃)₃ | 3.6 | 100 | 1.6 | 1.0 | 50 |
| 5 | 10.0 | * | 0 | —CH₂N⁺(CH₃)₂CH₂CH₂OH | 2.9 | 100 | 1.6 | 1.0 | 50 |
| 6 | 16.0 | * | 0 | —CH₂N(CH₃)₂ | 3.8 | 100 | 1.3 | 1.2 | 50 |
| 7 | 16.2 | 0 | 0 | —SO₂—C₆H₄—NH₂ | 3.2 | 100 | 1.4 | 0.6 | 50 |
| 8 | 16.2 | 0 | 0 | —COOH | 4.0 | 100 | 1.3 | 0.6 | 75 |
| 9 | 10.5 | * | 0 | —CH₂NH(CH₂)₆NH₂ | 5.2 | 100 | 1.5 | 1.2 | 50 |
| 10 | 10.2 | * | 0 | —CH₂(NHCH₂CH₂)₂NH₂ | 5.8 | 100 | 1.5 | 1.0 | 50 |
| 11 | 14.2 | 0 | 0 | —SO₂—C₆H₄—N(CH₃)₂ | 2.1 | 100 | 1.2 | 0.7 | 50 |
| 12 | 12.7 | 0 | 0 | —CO(CH₂CH₂)COOH | 4.0 | 100 | 1.4 | 0.8 | 75 |

The items marked 1) to 6) in the above table have the following meanings:
1) and 2): Number of crosslinkages per 100 aromatic nuclear structural units
3): The polystyrene fibrous material was immersed for 24 hours in boiling toluene at atmospheric pressure, and then dried to a constant weight. The percentage of the weight of the treated fibrous material based on the weight of the material before treatment was measured.
4): The polystyrene fibrous material was immersed for 72 hours in toluene at room temperature, and toluene adhering to the surface of the material was wiped off well by a filter paper. The weight of the treated material was measured, and the ratio of it based on the weight of the original fibrous material before immersion in toluene was calculated.
5): A 20 mm wide and 100 mm long polystyrene nonwoven cloth was cut out in the direction of the fiber axis, and heated for 1 hour at 200°C in air. The percentage of the change in length was calculated as against the original length before heating.
6): The total of the crosslinking reaction time and the ion-exchangeable group introducing time.
*The number of crosslinkages is not more than 2.

What we claim is:

1. A method for producing a solvent-resistant filamentary structure, which comprises reacting a filamentary structure comprising at least 20 percent by weight of aromatic nuclear structural units derived from an

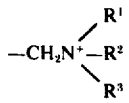

wherein $R^1$, $R^2$ and $R^3$ are the same or different and each represent an alkyl group having 1 to 4 carbon atoms, a phenyl group or β-hydroxyethyl group,

wherein $R^4$ and $R^5$ are the same or different, and each represent a hydrogen atom, an alkyl group containing 1 to 4 carbon atoms, a phenyl group or a β-hydroxyethyl group,

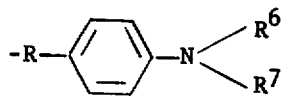

wherein $R^6$ and $R^7$ are the same or different and each represent a hydrogen atom or a methyl group, —CH- $_2$—(NHCH$_2$CH$_2$)$_n$—NH$_2$ wherein $n$ is an integer of 1 to 5, and —(CH$_2$NH—CH$_2$)$_m$—NH$_2$ wherein $m$ is 1 or an integer of 3 to 6, into a part or whole of the remainder of the aromatic nuclear structural units.

2. The method of claim 1 wherein said aromatic monovinyl monomer is selected from the group consisting of styrene, alpha-methyl styrene, halogenated styrenes, and vinyl naphthalenes.

3. The method of claim 1 wherein said filamentary structure is selected from polymers or copolymers of an aromatic monovinyl monomer selected from the group consisting of styrene, alpha-methylstyrene, halogenated sytrenes and vinyl naphthalenes, said polymer or copolymer containing at least 40 percent by weight of said aromatic monovinyl monomer.

4. The method of claim 3 wherein at least 65 percent by weight of the aromatic nuclear structural units of said polymer or copolymer are derived from said aromatic monovinyl monomer.

5. The method of claim 1 wherein said filamentary structure is reacted with chlorosulfonic acid to form a cross-linked structure in which 5 to 15 out of 100 of the aromatic nuclear structural units are cross-linked by crosslinkages of the formula (1).

* * * * *

UNITED STATES PATENT OFFICE
CERTIFICATE OF CORRECTION

Patent No. 3,927,968          Dated December 23, 1975

Inventor(s) SUZUKI, ET AL.

It is certified that error appears in the above-identified patent and that said Letters Patent are hereby corrected as shown below:

Column 18, please change the equation in line 2 to read as follows:

--  --

Signed and Sealed this

*twenty-third* Day of *March 1976*

[SEAL]

Attest:

RUTH C. MASON
*Attesting Officer*

C. MARSHALL DANN
*Commissioner of Patents and Trademarks*